United States Patent

Cymbal

[11] 4,096,717
[45] Jun. 27, 1978

[54] TRANSMISSION SHIFT CONTROL

[75] Inventor: William D. Cymbal, Freeland, Mich.

[73] Assignee: General Motors Corporation, Detroit, Mich.

[21] Appl. No.: 792,313

[22] Filed: Apr. 29, 1977

[51] Int. Cl.² .................. B60R 25/02; B60R 25/06; E05B 65/12

[52] U.S. Cl. ........................... 70/248; 70/254; 74/473 R; 180/82 A; 180/114

[58] Field of Search ............... 70/247, 248, 254, 252, 70/237; 180/82 A, 114; 74/473 R

[56] References Cited

U.S. PATENT DOCUMENTS

| | | | |
|---|---|---|---|
| 3,490,255 | 1/1970 | Wight et al. | 70/248 X |
| 3,553,987 | 1/1971 | Ball et al. | 70/248 X |
| 3,590,613 | 7/1971 | Kimberlin et al. | 70/248 X |
| 3,703,092 | 11/1972 | Elliot | 70/248 |

Primary Examiner—Roy D. Frazier
Assistant Examiner—William E. Lyddane
Attorney, Agent, or Firm—John P. Moran

[57] ABSTRACT

A column-mounted shift control arrangement for use with a shift tube and associated shift bowl having an "angular throw" such that REVERSE, FIRST and THIRD ratio positions are in the same circumferential location, and including (1) pivotable, spring-loaded locking means operatively connected between the shift tube and the gear sector on the lock cylinder to prevent the latter from being rotated to OFF LOCK until the shift tube is moved axially downwardly to REVERSE, and (2) interference means formed on the toothed rack associated with the gear sector to prevent the shift bowl from being rotated while in REVERSE.

3 Claims, 7 Drawing Figures

TRANSMISSION SHIFT CONTROL

This invention relates generally to automotive transmission shift controls, and more particularly to improved arrangements for transfer of control settings from the manually operated lever on the steering column to a change speed transmission of the selective sliding gear type.

In some instances, for particular vehicular transmission arrangements, a limitation may exist as to the available "angular throw" for REVERSE, causing the REVERSE shift position to be circumferentially aligned with SECOND ratio position in a three-speed arrangement, or with FIRST and THIRD ratio positions in a four-speed arrangement. In such a case, it is desirable to provide means preventing the lock cylinder from being rotated into the OFF LOCK position when the gear selector is in any position other than REVERSE and for locking the shift bowl only when the gear selector is in REVERSE.

Accordingly, an object of the invention is to provide an improved column-mounted shift control arrangement wherein the shift bowl is locked and the lock cylinder may be rotated into the OFF LOCK position, thereby permitting removal of the key therefrom, only when the gear selector is shifted to REVERSE.

Another object of the invention is to provide a column-mounted shift control arrangement including cam means operatively connected to the usual lock cylinder and locking bar means operatively connected between the usual shift tube and the nonrotatable housing at the upper end of the steering column for preventing the lock cylinder from being rotated into the OFF LOCK position when the gear selector lever and associated axially movable shift tube are in any position other than REVERSE.

A further object of the invention is to provide a column-mounted shift control arrangement including a jacket having a rotatable shift bowl and a nonrotatable housing mounted at the upper end thereof, a shift tube concentrically mounted within the jacket and shift bowl and slidably mounted at its upper end within a central hub bushing secured to the housing, a shift lever pivotally mounted on the shift bowl with its inner end operatively connected to the shift tube for axially moving the latter in either direction within the central hub bushing, the shift bowl being rotatable by manual movement of the shift lever through a predetermined angle in one direction to a common circumferential location for REVERSE position and at least one forward gear position, a gate formed on an inner surface of the shift bowl, a lock cylinder mounted in a wall of the housing and having a rotatable gear sector mounted at its inner end in engagement with an axially movable toothed rack having an off-set extension formed thereon, a cam formed on a side surface of the gear sector, a locking bar pivotally mounted on the central hub bushing adjacent the upper end of the shift tube, and resilient means operatively connected between the locking bar and the central hub bushing for urging the locking bar into contact with the cam, the shift tube being axially positioned to prevent the locking bar from being pivoted inwardly by the cam via manual rotation of the lock cylinder while in any forward gear ratio position, thereby preventing the lock cylinder from being rotated into the OFF-LOCK position until the shift lever is manually moved into the REVERSE position, thereby causing the shift tube to move axially to a predetermined position wherein the locking bar is pivoted past the upper edge thereof by the cam when the lock cylinder is rotated into the OFF-LOCK position, thus permitting the key to be removed from the lock cylinder while positioning the toothed rack such that the off-set extension of the toothed rack cooperates with the gate to prevent the shift bowl from being rotated by the shift lever.

These and other objects and advantages of the invention will be apparent when reference is made to the following description and accompanying drawings, wherein.

Figure 2:
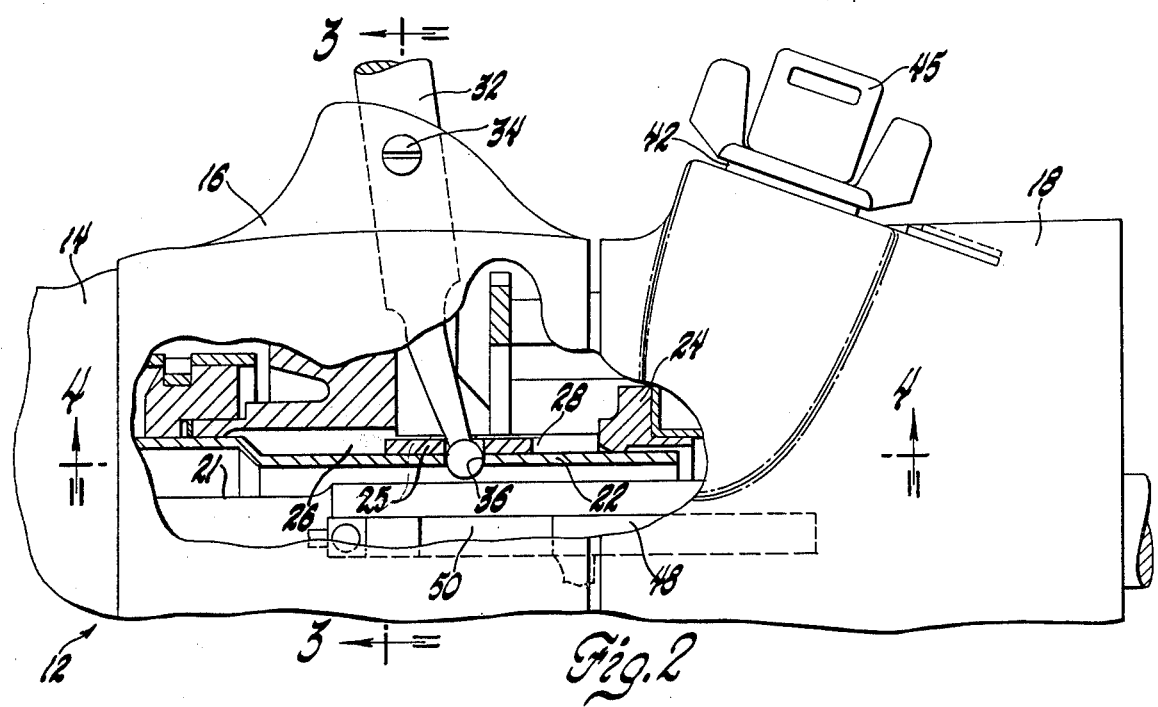
FIG. 2 is an enlarged top-plan view of a portion of a steering column shown in FIG. 1.
Figure 3:
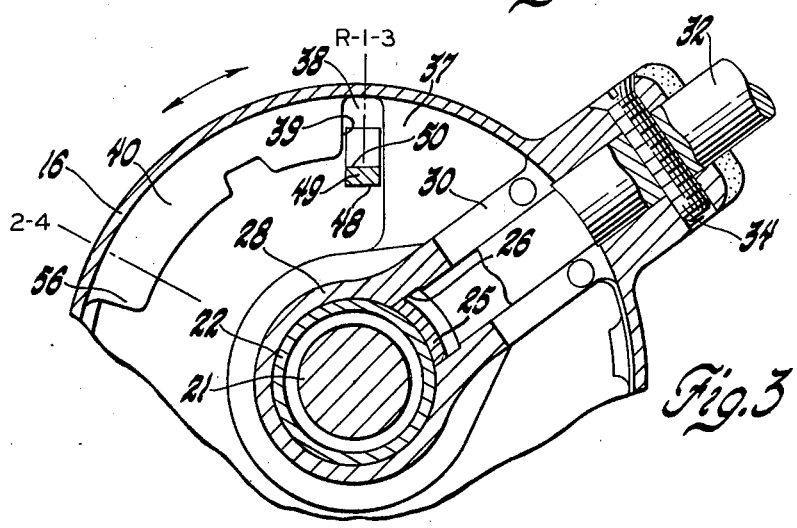
Figure 4:
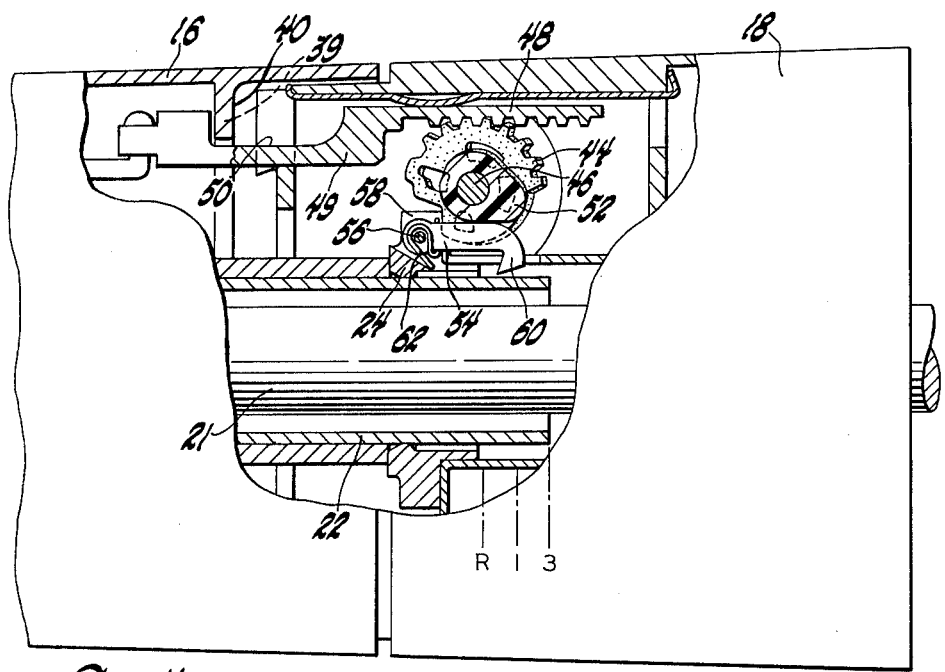
Figure 5:
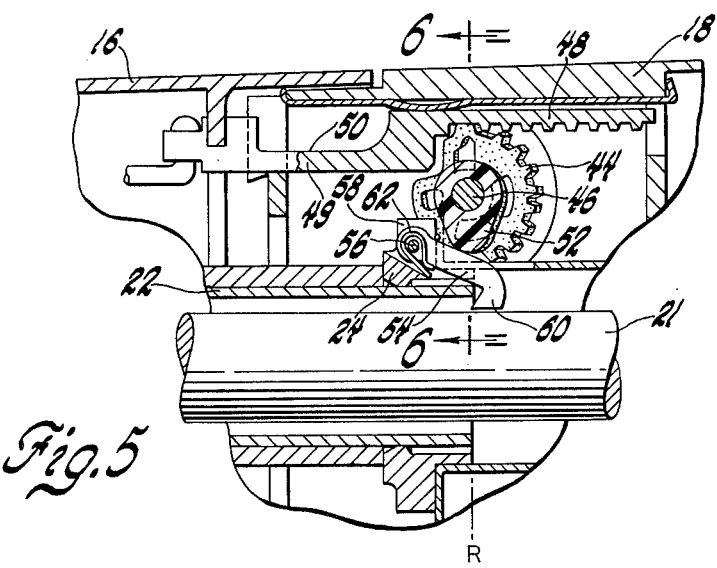
Figure 6:
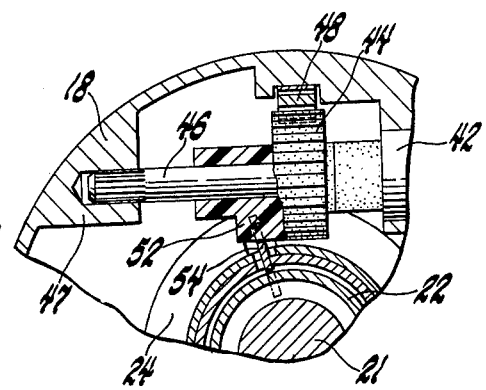

FIGS. 3 and 4 are fragmentary cross-sectional views taken along the planes of the lines 3—3 and 4—4, respectively, of FIG. 2, and looking in the directions of the arrows, FIG. 3 showing the shift bowl in a different operational position from that of FIG. 2;

FIG. 5 is a view similar to FIG. 4 showing the inventive components in a different operational position; and FIG. 6 is a fragmentary cross-sectional view taken along the plane of the line 6—6 of FIG. 5, and looking in the direction of the arrows.

Figure 1:
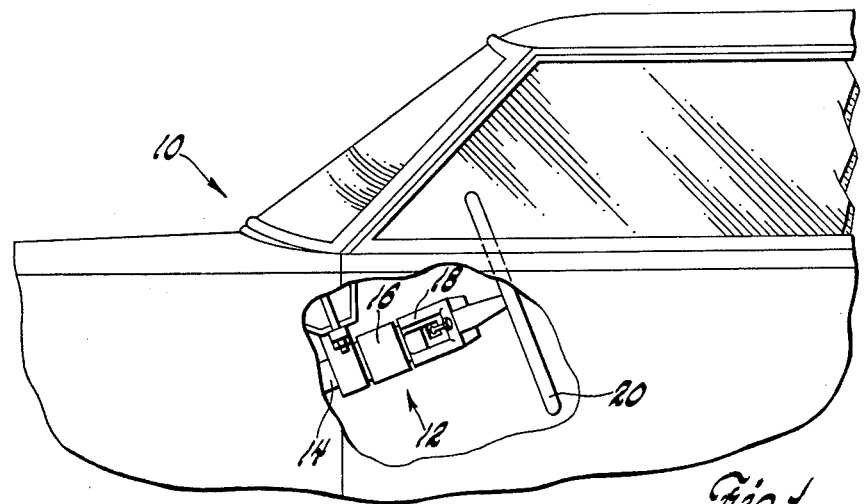
FIG. 1 is a fragmentary view of a vehicular steering column embodying the invention.

Referring now to the drawings in greater detail, FIG. 1 illustrates a vehicle 10 within which is mounted the usual steering column 12, including a non-rotatable jacket 14 with a rotatable shift bowl 16 and a non-rotatable housing 18 mounted at the upper end thereof. A steering wheel 20 is mounted on a steering shaft 21 rotatably mounted along the axis of the cylindrical housing 18, the shift bowl 16 and the jacket 14.

As shown in FIG. 2, a shift tube 22 is concentrically mounted within the jacket 14 and shift bowl 16, around the steering shaft 21, and slidably mounted at its upper end in a central hub bushing 24 secured to an inner surface of the housing 18. A key 25 is formed on the shift tube 22 and slidably confined in a slot 26 formed in a central support ring 28 portion of the shift bowl 16, a web 30 interconnecting the support ring 28 with the outer peripheral portion of the shift bowl 16. A manually actuated shift lever 32 is pivotally mounted via a suitable pivot 34 through a wall of the shift bowl 16, with the inner end thereof having a ball shape formed thereon for extension into an opening 36 formed in the shift tube 22. Thus, the shift tube 22 may be selectively axially moved in either direction within the central hub bushing 24 by the appropriate pivoting of the lever 32, and may be rotated, along with the shift bowl 16, through a limited distance by the appropriate rotation of the lever 32 with respect to the longitudinal axis of the shift tube 22.

As shown in FIG. 3, stop member 37 is formed between a side surface of the web 30 and an inner surface of the shift bowl 16, a predetermined space 38 apart from one end 39 of a gate 40 formed on an inner surface of the shift bowl 16. A lock cylinder 42 (FIG. 2) is mounted in a wall of the housing 18. A gear section 44 (FIG. 4) is secured to the inner end of the lock cylinder 42 for rotation therewith in response to the turning of a conventional key 45 (FIG. 2). The gear sector 44 is rotatably mounted on a pin 46 (FIG. 6) secured in an opening of a boss 47 formed on an inner surface of the housing 18, and engages an axially movable toothed rack 48 (FIG. 4) having an extension 49 including an off-set 50 formed thereon for cooperation with the gate 40, as will be explained.

A cam 52 is formed on a side surface of the gear sector 44 for rotation therewith. A locking bar 54 is pivotally mounted via a pivot pin 56 on a radially extending surface 58 formed on the central hub bushing 24 such that a bent end 60 formed on the locking bar 54 extends toward the upper end of the shift tube 22. A suitable spring 62 is operatively connected between the locking bar 54 and the central hub bushing 24 for urging the locking bar into contact with the cam 52.

Figure 2A:
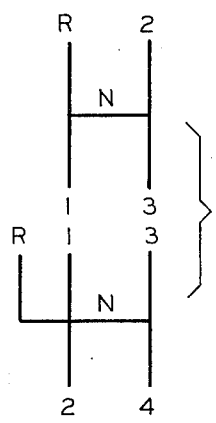
FIG. 2a is a graphic representation of two operational characteristics of the invention.

In operation, it may be noted by referring first to FIGS. 2 and 2a that, basically, pivotal movement of the shift lever 32 across the NEUTRAL or "N" plane of FIG. 2a axially positions the shift tube 22 for selective rotation of the shift bowl 16 into the desired gear position. By referring now to FIG. 3, it may be noted that, as the shift bowl 16 is rotated via the shift lever 32 in a counterclockwise direction from NEUTRAL of a typical manual shifting pattern, the stop member 37 formed between the web 30 and the shift bowl 16 abuts against the rack 48, thereby establishing a common circumferential position of the bowl for REVERSE, FIRST and THIRD gear positions (four-speed and REVERSE arrangement). Rotating the shift bowl 16 clockwise, causing the gate 40 to traverse through the off-set 50 of the extension 49 until the rack 48 is positioned adjacent the other end 56 (FIG. 3) of the gate 40, establishes a common circumferential position of the bowl for SECOND and FOURTH gear positions.

Referring now to FIG. 4, it is noted that the upper end of the shift tube 22 is positioned in THIRD gear ratio position, such being the upper limit of travel in response to pivotal movement of the shift lever 32 (FIG. 2). It's apparent from FIG. 4 that if an attempt were made to rotate the cam 52 via the key 45 and lock cylinder 42, the bent end 60 of the locking bar 54 would be stopped by the shift tube 22, thereby preventing such rotation of the lock cylinder 42 and the key 45. The result would be the same if the shift tube 22 were axially positioned in the FIRST gear position. In such a RUN condition it may be noted that there is no interference between the gate 40 and the lower thick portion of the rack 48 and hence, the shift bowl 16 may be selectively rotated into R, 1, 2, 3 or 4 gear positions.

Now, when the shift tube 22 is axially moved to REVERSE (FIG. 5), the key 45 and, hence, the lock cylinder 42 and the associated gear sector 44 and cam 52 may be rotated to OFF LOCK by virtue of the bent end 60 of the locking bar 54 being pivoted by the cam 52 past the upper end of the shift tube 22, as shown in FIG. 5. It is in only this position that the key 45 may be removed from the lock cylinder 42.

In the OFF LOCK-REVERSE condition illustrated in FIG. 5, it may additionally be noted that the lower thick portion of the extension 49 of the axially movable rack 48 is positioned adjacent the end 39 of the gate 40, thereby preventing the shift bowl 16 from being rotated if an attempt were made to rotate same by the manual actuation of the associated shift lever 32. By other means not a part of this invention, namely a locking pin (not shown), generally coupled to the toothed rack 48 for movement therewith, the steering wheel 20 is also locked against rotation until such time as the key 45 is once again placed in the lock cylinder 42 and rotated to a START or OFF UNLOCKED position in the usual manner of operation.

It's apparent that the invention provides a compact, simplified means for locking the shift bowl and permitting removal of the key in REVERSE only, for column-mounted shift control arrangements when the circumferential or "angular throw" of the shift bowl is limited and REVERSE is circumferentially aligned with SECOND ratio position in a three-speed arrangement, or with FIRST and THIRD ratio positions in a four-speed arrangement.

While but one embodiment of the invention has been shown and described, other modifications thereof are possible.

What is claimed is:

1. For use with a synchromesh steering column including a jacket having a rotatable shift bowl and a nonrotatable housing mounted at the upper end thereof, a shift tube concentrically mounted within the jacket and shift bowl and slidably mounted at its upper end within a central hub bushing secured to the housing, a shift lever pivotally mounted on the shift bowl with its inner end operatively connected to the shift tube for axially moving the latter in either direction within the central hub bushing, the shift bowl being rotatable by manual movement of the shift lever through a predetermined angle in one direction to a common circumferential location for REVERSE position and at least one forward gear position, a gate formed on an inner surface of the shift bowl, a lock cylinder mounted in a wall of the housing and having a rotatable gear sector mounted at its inner end in engagement with an axially movable toothed rack having an off-set extension formed thereon, the improvement comprising a cam formed on a side surface of the gear sector, a locking bar pivotally mounted on the central hub bushing adjacent the upper end of the shift tube, and resilient means operatively connected between the locking bar and the central hub bushing for urging the locking bar into contact with the cam, the shift tube being axially positioned to prevent the locking bar from being pivoted inwardly by the cam via manual rotation of the lock cylinder while in any forward gear position, thereby preventing the lock cylinder from being rotated into the OFF-LOCK position until the shift lever is manually moved into the REVERSE position, thereby causing the shift tube to move axially to a predetermined position wherein the locking bar is pivoted past the upper edge thereof by the cam when the lock cylinder is rotated into the OFF-LOCK position, thus permitting the key to be removed from the lock cylinder while positioning the toothed rack such that the off-set extension of the toothed rack cooperates with the gate to prevent the shift bowl from being rotated by the shift lever.

2. For use with a synchromesh steering column including a jacket having a rotatable shift bowl and a nonrotatable housing mounted at the upper end thereof, a shift tube concentrically mounted within the jacket and shift bowl and slidably mounted at its upper end within a central hub bushing secured to the housing, a shift lever pivotally mounted on the shift bowl with its inner end operatively connected to the shift tube for axially moving the latter in either direction within the central hub bushing to predetermined shifting planes, the shift bowl being rotatable by manual movement of the shift lever through a predetermined angle in one direction to a common circumferential location for REVERSE position and FIRST and THIRD forward gear positions, a gate formed on an inner surface of the shift bowl, a lock cylinder mounted in a wall of the housing and having a rotatable gear sector mounted at its inner end in engagement with an axially movable toothed rack having an off-set extension formed thereon, the improvement comprising a cam formed on a side surface of the gear sector, a locking bar pivotally mounted on the central hub bushing adjacent the upper end of the shift tube, and resilient means operatively connected between the locking bar and the central hub bushing for urging the locking bar into contact with the cam, the shift tube being axially positioned to prevent the locking bar from being pivoted inwardly by the cam via manual rotation of the lock cylinder while in the FIRST or THIRD gear positions, thereby preventing the lock cylinder from being rotated into the OFF-LOCK position until the shift lever is manually moved into the REVERSE position, thereby causing the shift tube to move axially to a predetermined position wherein the locking bar is pivoted past the upper edge thereof by the cam when the lock cylinder is rotated into the OFF-LOCK position, thus permitting the key to be removed from the lock cylinder while positioning the toothed rack such that the off-set extension of the toothed rack cooperates with the gate to prevent the shift bowl from being rotated by the shift lever.

3. For use with a synchromesh steering column having a fixed cylindrical housing mounted at the upper end thereof, a gearshift bowl assembly comprising a shift tube, a cylindrical shift bowl surrounding and concentric with said shift tube, a central hub bushing secured to said housing and adapted to slidably receive said shift tube, a lever support member formed on an outer surface of said shift bowl, a manually actuated shift lever pivotally mounted through said lever support member and having the inner end thereof operatively connected to said shift tube for axially positioning said shift tube in a selected shifting plane suitable for rotating said shift bowl into one of REVERSE, FIRST, SECOND, THIRD and FOURTH gear positions, a gate formed on an inner surface of said shift bowl and rotatable therewith, a manually actuated lock-cylinder operatively mounted in a wall of said housing and adapted to being selectively rotated into START, RUN, OFF-UNLOCK and OFF-LOCK positions, a gear sector rotatably mounted in said housing and operatively connected to the inner end of said lock cylinder for rotation therewith, a toothed rack slidably mounted in said housing in engagement with said gear sector and movable axially in response to rotation of said gear sector for cooperation with said gate in said shift bowl to prevent said gear sector from being rotated by said lock cylinder into the OFF-LOCk position when said shift lever is positioned in SECOND and FOURTH gear positions, a cam formed on a side surface of said gear sector, a locking bar pivotally mounted on said central hub bushing adjacent said shift tube, and resilient means operatively connected between said locking bar and said central hub bushing for urging said locking bar into contact with said cam, said shift tube being axially positioned to prevent said locking bar from being pivoted inwardly by said cam via manual rotation of said lock cylinder while said shift lever is in FIRST and THIRD gear positions, thereby preventing said gear sector from rotating and, hence, preventing said lock cylinder from being rotated into the OFF-LOCK position until said shift lever is manually placed in REVERSE, causing said shift tube to move axially to a position wherein said locking bar can be pivoted past the upper edge thereof by said cam when said lock cylinder is rotated into the OFF-LOCK position.

* * * * *